June 11, 1940.     J. R. THORP     2,203,933

ACCELERATOR PEDAL

Filed Oct. 2, 1939

INVENTOR
Joel R Thorp
BY
Morsell, Lieber & Morsell
ATTORNEY

Patented June 11, 1940

2,203,933

UNITED STATES PATENT OFFICE 2,203,933

ACCELERATOR PEDAL

Joel R. Thorp, West Allis, Wis., assignor to The Fulton Company, West Allis, Wis., a corporation of Wisconsin Application October 2, 1939, Serial No. 297,526

11 Claims. (Cl. 74—513)

The present invention relates in general to improvements in the construction and operation of foot pedals, and especially accelerator pedals or the like for automobiles.

Generally defined, an object of the invention is to provide a new and useful foot pedal which is simple in construction and efficient in use.

Some of the more specific objects of my invention are as follows:

To provide a durable pedal assemblage, which can be readily manufactured and installed, and which may be used for diverse purposes.

To provide an improved pedal for automobile accelerators or the like, which insulates the user's foot against extreme engine heat which may rise or be transmitted through the floor boards and metallic connections, and which will also absorb vibration.

To provide a non-slip accelerator pedal which is cushioned to make its use restful to the operator.

To provide a foot pedal accessory which may be quickly and conveniently installed, and which is adapted to effectively cooperate with the accelerator mechanisms of various types of standard automobiles.

To provide an improved pedal structure which may be firmly engaged by the operator's foot, which may be installed in various positions, and which is highly attractive in general appearance.

To provide an improved foot pedal formed of sheet metal and rubber, wherein the rubber is effectively attached to the reinforcing metal, and which may be readily applied to standard motion transmitting connections.

To provide an improved accelerator pedal which may be manufactured and sold at moderate cost, and which is readily adjustable to suit various conditions of installation.

These and other objects and advantages will be apparent from the following detailed description.

A clear conception of one embodiment of my invention in an automobile accelerator pedal, may be had by referring to the drawing accompanying and forming a part of this specification wherein like reference characters designate the same or similar parts in the various views.

Figure 2:
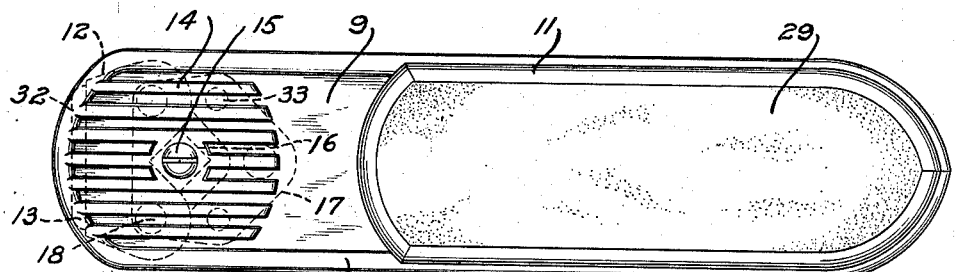
Fig. 2 is a full top view of the pedal of Fig. 1.

While the invention has been described as being especially applicable to an automobile foot accelerator pedal, it is not my intent or desire to unnecessarily restrict the scope or utility by virtue of such specific embodiment.

Referring to the drawing, my improved pedal assemblage as shown therein, comprises in general an elongated sheet metal pedal plate 8 having an upper rubber covering 9 and an integral depending rubber lug 10; a soft sponge rubber pad 11 secured to the upper surface of the covering 9 above the lug 10; a detachable sheet metal bracket attaching plate 12 having a rubber insert 13 and being secured to the lower end of the plate 8 beneath the heel pad 14 of the covering 9, by means of a bolt 15 and nut 16; and a sheet metal supporting bracket 17 having hinge studs or buttons 18 cooperable with the insert 13.

Figure 1:
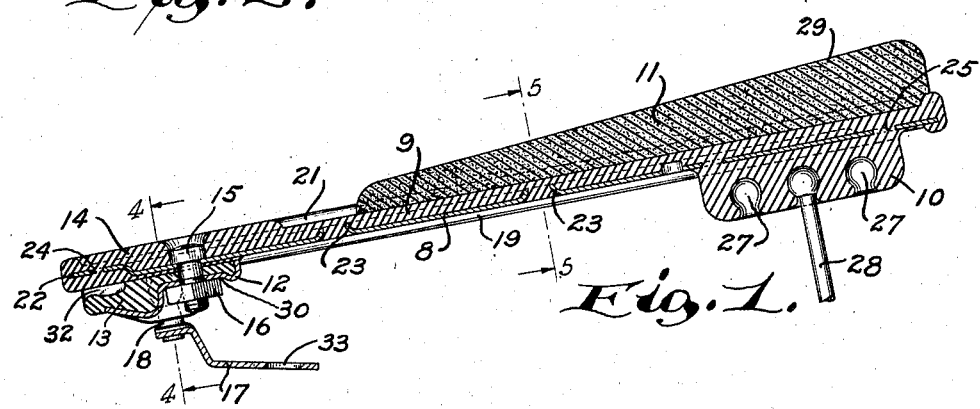
Fig. 1 is a central vertical longitudinal section through one of my improved accelerator pedal assemblages, showing the same slightly inclined and applied to a standard accelerator rod.
Figure 3:
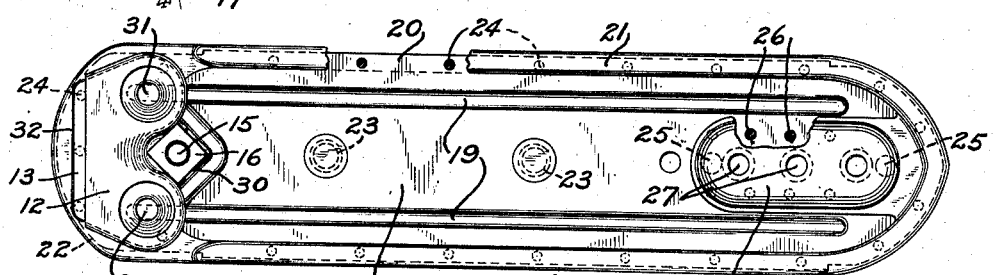
Fig. 3 is a bottom view of the pedal without its supporting bracket, portions of the rubber having been broken away.
Figures 4, 6:
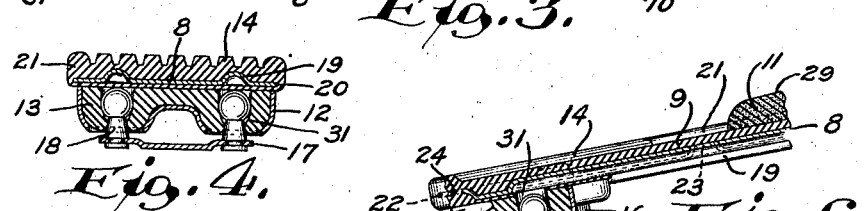
Fig. 4 is a transverse section through the pedal and supporting bracket of Fig. 1, taken along the line 4—4.
Fig. 6 is a longitudinal section through a fragment of the pedal and bracket assemblage, taken through one of the bracket attaching buttons.
Figure 5:
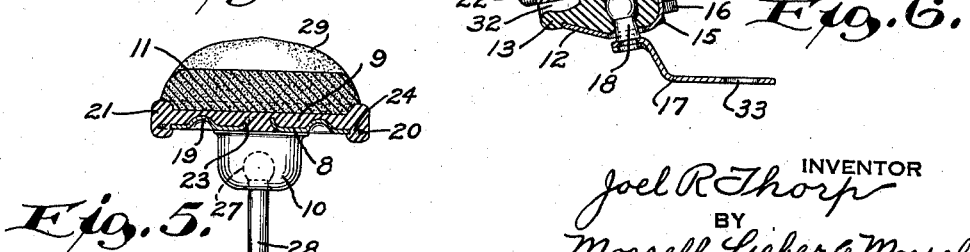
Fig. 5 is a transverse section through the pedal of Fig. 1, taken along the line 5—5.

The sheet metal plate 8 upon which the rubber covering 9 is disposed and which provides a rigid support for this covering, may be provided with spaced longitudinally extending corrugations 19, and has its opposite side edges 20 embedded in thickened side beads or portions 21 formed integral with the covering. The heel portion 22 of the plate 8 may be offset upwardly as shown in Figs. 1 and 6, and embedded in the heel pad 14 which is also formed integral with the covering 9, and the medial part of the plate 8 may also be provided with upwardly projecting integral annular flanges 23 which are embedded in the covering 9. In addition to these various anchorages between the plate 8 and covering 9, the plate is provided with numerous holes 24 connecting the portions of the covering which are located above and below the plate 8, and the lug 10 is integrally connected with the covering 9 through other holes 25, 26. The covering 9 and lug 10 may be cast about and vulcanized to the plate 8, and the lug 10 has substantially spherical sockets 27 formed therein for snug reception of the spherical upper end of a standard accelerator actuating rod 28.

The soft rubber cushion tread pad 11 is preferably formed of sponge rubber or the like, and may be adhesively attached to the upper flat surface of the covering 9 between the beaded side portions 21 of the latter. The pad 11 is preferably somewhat thicker at the toe end of the pedal and the top of the pad 11 is also preferably provided with a pebble surface 29 in order to avoid slippage.

The sheet metal bracket attaching plate 12 has a square socket 30 cooperable with the attaching nut 16, and the head of the clamping bolt 15 coacts with the plate 8 as shown in Fig. 1. The insert 13 which is also formed of soft rubber, is loosely applied within the dished plate 12 and has approximately spherical sockets 31 therein, and is also provided with a transverse end recess 32. The sockets 31 are adapted to receive the spherical buttons 18 in the manner shown in Figs. 4 and 6, to thereby hingedly attach the supporting bracket 17 to the pedal. The bracket 17 which is preferably formed of sheet metal, may be secured to the floor boards by means of screws or bolts penetrating the holes 33 of this bracket, and the buttons 18 are rigidly secured to the bracket 17 by riveting, welding or otherwise.

The plates 8, 12 and the bracket 17, may all be readily formed of sheet metal with the aid of simple punches and dies. The plate 8 while being slightly upwardly distorted, has no integral downwardly projecting or depending metal projections and is substantially flat. The rubber portions of the assemblage may be readily formed of suitable rubber by casting the same in forms, and the sockets 27, 31, 32 should be so formed that the elements coacting therewith may be snapped into position and subsequently effectively retained by the resiliency of the rubber. The plate 12 and its insert 13, may obviously be located in any desired angular position about the central axis of the bolt 15, and when the recess 32 is associated with a supporting element such as furnished with certain automobiles, to provide a hinged support for the pedal, then the bracket 17 with its buttons 18 will not be utilized.

Assuming the assemblage to be properly constructed in the manner above described, the buttons 18 of the bracket 17 may be pushed within the sockets 31 of the insert 13, either with the bracket 17 pointing forwardly as in Fig. 1, or rearwardly with respect to its pivot buttons 31. The accelerator 28 may be caused to coact with either of the spherical sockets 27 of the lug 10, and the pedal may assume various angular positions with respect to the supporting bracket 17. Application of foot pressure to the soft pad 11 will then cause the pedal to swing about the spherical buttons 18, and the spherical head of the rod 28 will permit swinging of the pedal relative to the rod 28. The cushion 11 will be slightly compressed during the downward swinging of the pedal, but will assume its natural form when the foot pressure is released. The improved pedal assemblage can obviously be readily installed under varying conditions of operation and in some cases the bracket 17 will not be utilized, but a hinged support may then be caused to coact with the recess 32 of the insert 13.

From the foregoing detailed description it will be apparent that my present invention provides an improved pedal assemblage which is simple and compact in construction and which may be readily installed under varying conditions. The rubber pad 9 of the improved structure is firmly attached to a relatively simple reinforcing plate 8, and the adjustability of the plate 12 and insert 13 makes the assemblage readily applicable to varying conditions of installation. The lug 10 is firmly united to the covering 9, and the pad 11 may likewise be firmly attached to this covering, and the covering is obviously firmly attached to the plate 8 by means of the side beads 21, offset portion 22, and flanges 23. The assemblage besides being durable in construction and readily installable, has neat appearance, and the improvement has proven highly successful in actual commercial use. It has been found that the improved pedal assemblage can be applied to many of the standard automobiles, and besides being restful in operation and safely manipulable, the improved pedal insulates the operator's foot against engine heat and absorbs excessive vibration.

It should be understood that it is not intended to limit this invention to the exact details of construction, or to the precise mode of use, herein shown and described, for various modifications within the scope of the claims may occur to persons skilled in the art.

I claim:

1. A pedal assemblage comprising, a pedal plate having heel and toe portions, a rigid dished mounting plate having a separable flexible socketed insert therein adjustably secured to the heel portion of said pedal plate, and means for connecting the toe portion of said pedal plate to a mechanism to be actuated.

2. A pedal assemblage comprising, a pedal plate having heel and toe portions, a rigid dished mounting plate having a separable flexible socketed insert therein adjustably secured to the heel portion of said pedal plate, means coacting with the sockets of said insert for swingably supporting said pedal plate, and means for connecting the toe portion of said pedal plate to a mechanism to be actuated.

3. A pedal assemblage comprising, a pedal plate having a resilient covering on its upper face provided with heel and toe portions, a rigid dished mounting plate having a separable flexible socketed insert therein adjustably attached to the lower face of the heel portion of said pedal plate, a flexible socketed lug secured to said pedal plate and covering at the toe portion thereof, and spherical elements confined within the sockets of said insert and said lug.

4. A pedal assemblage comprising, a pedal plate having a resilient covering on its upper face provided with heel and toe portions, a rigid dished mounting plate having a separable flexible socketed insert therein adjustably attached to the lower face of the heel portion of said pedal plate, a flexible socketed lug secured to said pedal plate and covering at the toe portion thereof, a supporting bracket having a spherical portion coacting with the socket of said insert to swingably suspend said pedal plate, and a mechanism actuating rod having a spherical head coacting with the socket of said lug.

5. A pedal assemblage comprising, a pedal plate having a rubber top covering and a depending socketed lug depending from the toe portion of said covering, a sponge rubber pad secured to said covering above said lug, a heel plate secured to the bottom of the heel portion of said pedal plate and having a socketed rubber insert thereon, means for adjustably attaching said plates to each other, and a hinge bracket coacting with the socket of said insert.

6. A pedal assemblage comprising, a pedal plate having a rubber top covering and a depending socketed lug depending from the toe portion of said covering, a sponge rubber pad secured to said covering above said lug, a heel plate secured to the bottom of the heel portion of said pedal plate and having a socketed rubber insert thereon, means for adjustably attaching said plates to each other, and a hinge bracket having spherical buttons cooperable with the sockets of said insert to swingably support said pedal plate.

7. A pedal assemblage comprising, a relatively flat sheet metal pedal plate, a rubber covering for the top of said pedal plate having toe and heel portions, a socketed lug depending from the toe portion of said pedal plate and being formed integral with said covering, a dished plate secured to the heel portion of said pedal plate, a socketed rubber pivot element secured to the heel portion of said pedal plate by said dished plate, and a bracket having spherical buttons articulably associated with the sockets of said element.

8. A pedal assemblage comprising, a sheet metal pedal plate having toe and heel portions, a rubber covering for the entire top of said plate and in which the edge of said plate is embedded, a socketed lug depending from the toe portion of said plate and being formed integral with said covering, a dished plate adjustably secured to the heel portion of said pedal plate, a socketed rubber insert secured to said pedal plate by said dished plate, and hinge means coacting with the socket of said insert.

9. A pedal assemblage comprising, a sheet metal pedal plate having toe and heel portions, a rubber covering for the entire top of said plate and in which the edge of said plate is embedded, a socketed lug depending from the toe portion of said plate and being formed integral with said covering, a dished plate adjustably secured to the heel portion of said pedal plate, a socketed rubber insert secured to said pedal plate by said dished plate, and a bracket having pivot buttons swingably confined within sockets of said insert.

10. A pedal assemblage comprising, a sheet metal pedal plate having toe and heel portions, a rubber covering for the entire top of said plate and in which the edge of said plate is embedded, a socketed lug depending from the toe portion of said plate and being formed integral with said covering, a dished plate adjustably secured to the heel portion of said pedal plate, a socketed rubber insert secured to said pedal plate by said dished plate, and a bracket having several fixed pivot buttons reversibly cooperable with sockets in said rubber insert.

11. A pedal assemblage comprising, a pedal plate provided with heel and toe portions, a mounting plate having a flexible socketed insert therein attached to the lower face of the heel portion of said pedal plate, a flexible lug provided with a plurality of sockets secured to said pedal plate at the toe portion thereof, means coacting with the sockets of said insert for swingably supporting said pedal plate, and means coacting with one of the sockets of said lug for actuating a mechanism.

JOEL R. THORP.